United States Patent [19]

Nakashima

[11] 4,057,700
[45] Nov. 8, 1977

[54] FLUID LEVEL INDICATOR

[75] Inventor: Katsushi Nakashima, Kariya, Japan

[73] Assignee: Aisin Seiki Kabushiki Kaisha, Japan

[21] Appl. No.: 659,936

[22] Filed: Feb. 20, 1976

[30] Foreign Application Priority Data

Feb. 21, 1975 Japan .................................. 50-22289

[51] Int. Cl.² ........................................... H01H 35/18
[52] U.S. Cl. ............................. 200/84 C; 200/81.9 M;
340/244 E
[58] Field of Search ................... 200/84 B, 84 C, 61.2,
200/82 D, 81.9 M; 335/205; 73/308, 313, 319,
334; 116/110, 118 R; 340/526, 59, 60, 244 A,
244 E; 158/151 A

[56] References Cited

U.S. PATENT DOCUMENTS

| 3,560,918 | 2/1971 | Lewis | 200/84 C |
| 3,603,925 | 9/1971 | Hughes | 340/244 E |
| 3,894,433 | 7/1975 | Riester | 73/313 |
| 3,922,657 | 11/1975 | Hayashida | 340/59 |
| 3,947,813 | 3/1976 | Uemura | 200/84 C |

FOREIGN PATENT DOCUMENTS 1,615,911  9/1969  Germany ........................ 200/84 C Primary Examiner—Gerald P. Tolin
Attorney, Agent, or Firm—Oblon, Fisher, Spivak, McClelland & Maier

[57] ABSTRACT

A fluid level indicator for a reservoir of a brake tandem master cylinder includes a pair of partition walls extending vertically upwardly from the bottom of the reservoir and thereby dividing the reservoir into three chambers. One chamber is in fluid communication with one brake circuit, another chamber is in fluid communication with the other brake circuit, and the third or middle chamber defined between the two partition walls is utilized for sensing and indicating the fluid level of brake oil within the reservoir.

2 Claims, 5 Drawing Figures

1

FLUID LEVEL INDICATOR

BACKGROUND OF THE INVENTION

1. Field of the Invention

The present invention relates generally to fluid level indicators, and more particularly to a fluid level indicator for a reservoir of a vehicle brake tandem master cylinder.

2. Description of the Prior Art

With a view to insuring the safe operation of a vehicle, a demand has recently arisen for a fluid level indicator which will provide a driver with a warning notifying such person of a decrease in the bake oil within the fluid reservoir.

In the case of a tandem master cylinder, two independent reservoirs have hitherto been employed, however, in order to provide an indication of the brake fluid, an indicator for each reservoir is required for the respective brake circuits resulting in an increase in manufacture costs.

In order to obviate this drawback, there has been provided one indicator within a reservoir having one partition wall disposed therein for dividing the reservoir into two fluid chambers, as shown within FIGS. 2 and 4. Such an improvement, however, still exhibits a serious drawback in that when the vehicle is operating upon an uneven road, or alternatively, when the vehicle is suddenly braked, the fluid level within the reservoir is irregular or inclined such that the indicator, which is actuated in response to a change in the fluid level, may be erroneously actuated.

SUMMARY OF THE INVENTION

Accordingly, it is an object of the present invention to provide an improved fluid level indicator which is to be especially utilized for a brake tandem master cylinder of a vehicle.

Another object of the present invention is to obviate the above drawbacks characteristic of conventional apparatus.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF A PREFERRED EMBODIMENT

Figure 1:
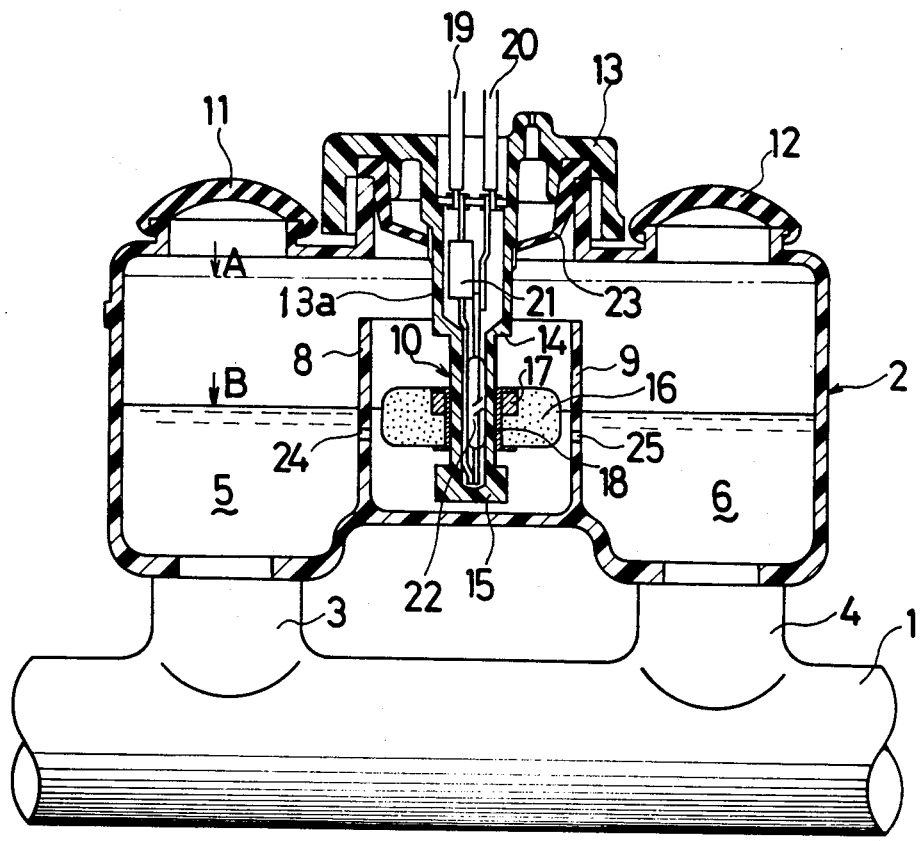
FIG. 1 is an elevation view, partly in cross-section, of a fluid level indicator constructed in accordance with the present invention and showing its cooperative parts.

Referring now to the drawings, a brake tandem master cylinder 1 has operatively associated therewith a reservoir 2 which is in fluid communication with the master cylinder 1 through means of ports 3 and 4 integrally formed therewith, and is divided into three chambers 5, 6, and 7 by means of a pair of parallel partition walls 8 and 9 which extend vertically upwardly from the bottom of the reservoir 2 so as to project close to the top thereof. The first chamber 5 is defined by means of one side wall of the reservoir and the partition wall 8, and supplies brake fluid contained therein to a first brake circuit through means of port 3 of the master cylinder 1.

The second chamber 6 is defined by means of the other side wall of the reservoir and the other partition wall 9, and supplies brake fluid contained therein to a second brake circuit through means of port 4 of the master cylinder while the third or middle chamber 7, defined by means of the two parallel partition walls 8 and 9, is seen to be disposed at substantially the central portion of the reservoir 2 and is open at the upper end thereof so as to be fluidically connectable to both chambers 5 and 6.

The reservoir 2 is generally formed of a semi-transparent resin material so that the level of oil contained therein may be seen from the exterior thereof, and sufficient brake oil is charged into the reservoir 2 so as to amply supply brake pressure to each brake circuit, the normal level of oil being represented at A within FIG. 1.

A fluid level indicator, generally indicated by the reference character 10, is disposed within the middle chamber 7 for indicating the level of fluid therewithin when the same is decreased below a predetermined level such as that indicated at B within FIG. 1. The upper side of reservoir 2 is provided with three cap members 11, 12, and 13 which respectively correspond to the three chambers 5, 6, and 7, the members 11 and 12 being made of, for example, rubber, while the middle cap member 13 is made of, for example, a plastic material.

Cap member 13 is seen to include a dependent, cylindrical, stepped projection 13a which extends inwardly into the middle chamber 7 and which defines two shoulders 14 and 15 between which is slidably disposed a float 16 made of, for example, a porous resin material, the float 16 being reciprocable between the two shoulders 14 and 15 in response to the increase or decrease in the fluid level within the middle chamber 7. When the fluid level is above the upper shoulder 14, the float is engaged with the shoulder 14 and maintained within such an uppermost position, while when the fluid level is below the lower shoulder 15, then the float 16 is engaged with the shoulder 15 and maintaned within such a lowermost position.

A tubular magnet 17 is secured to the float 16 by means of a securing element 18, and is movable integrally with the float 16 in response to the change in the fluid level. Within the projection 13a there is housed an electric circuit comprising a pair of lead wires 19 and 20, a resistor 21, and a normally open reed switch 22. The two wires 19 and 20 are connected to an electric power supply, not shown, and a warning lamp, also not shown, is provided between the power supply and one of the wires 19 and 20.

The lamp is illuminated when the reed switch 22 is actuated to its closed position, and as the reed switch 22 is disposed at substantially the same level as that of the predetermined low fluid level B of the brake oil, the reed switch 22 will be closely by means of the magnet 17 when the float 16 is positioned at the corresponding level of the reed switch 22 as shown within FIG. 1.

A diaphragm member 23 has its outer periphery secured to the middle cap member 13 and its inner periphery engaged with the dependent projection 13a of the cap member 13 for sealing the brake oil within the reservoir 2, and consequently, when the cap member 13, as well as the projection 13d is detached from the reservoir, the diaphragm 23 is similarly detached therewith.

Each partition wall 8 and 9 is provided with a bore 24 and 25, respectively, disposed just below the predetermined fluid level B for providing fluidic communication between the three chambers 5, 6, and 7, and in this manner, even when the brake oil, within one of the chambers 5 or 6 should suddenly be decreased due to a failure within the corresponding brake circuit, oil is able to be supplied through means of the bore 24 and 25 in order to insure the brake operation thereof.

Figure 2:
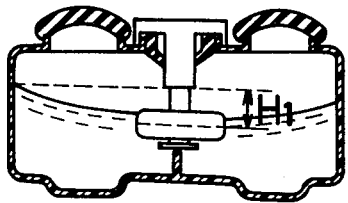
FIG. 2 is a schematic view of a conventional fluid indicator device mounted within a vehicle and shown under operative conditions when the vehicle is being operated under uneven road conditions.
Figure 3:
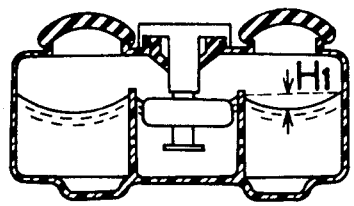
FIG. 3 is a view similar to that of FIG. 2 showing however the operation of the fluid indicator device of the present invention under similar conditions.

Referring now to the operation of the present invention in accordance with FIGS. 2-5, assuming the vehicle is operating upon an uneven road, the fluid within the reservoir will be as shown within FIG. 3, the degree of descent of the fluid within chamber 7 being minimized due to the disposition of the two partition walls 8 and 9, as compared to the disposition of the fluid within the conventional device as shown within FIG. 2. This means that the downward movement of the float 16 is considerably prevented so as not to erroneously actuate the reed switch 22 when the fluid surface is nevertheless above the level B.

Figure 4:
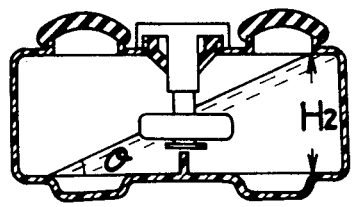
FIG. 4 is a view similar to that of FIG. 2 showing the operation of the conventional fluid indicator under operative conditions when the vehicle is suddenly braked.
Figure 5:
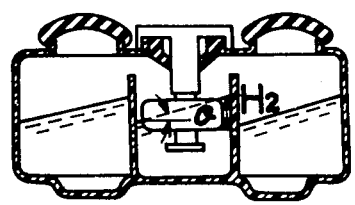
FIG. 5 is a view similar to that of FIG. 4 showing however the operation of the fluid indicator device of the present invention under similar conditions.

Assuming now the vehicle is suddenly braked, the fluid within the reservoir will be inclined, as shown within FIG. 5, however, the angle of inclination $\sigma$ is smaller than that of the conventional device, as shown within FIG. 4, whereby the descent of the float is not as great so as not to erroneously actuate the reed switch 22.

Thus, it may be seen that in accordance with the present invention, the fluid level variation within chamber 7 is maintained as small as possible so that the downward movement of the float, due to unusual conditions of the vehicle, may be considerably minimized so as not to erroneously indicate the pseudo-warning fluid level of the reservoir.

Obviously, many modifications and variations of the present invention are possible in light of the above teachings. For example, within the illustrated embodiments, the indicator 10 has been shown as being disposed within the hollow cylindrical projection 13a which is integrally formed with the cap member 13. However, in lieu thereof, such projection may likewise be integrally formed with the bottom portion of the reservoir 2 and may have a form similar to that of partition walls 8 and 9, that is, the projection may extend upwardly from the bottom wall of reservoir 2 and may be interposed between partition walls 8 and 9. It is to be understood therefore that within the scope of the appended claims, the present invention may be practiced otherwise than as specifically described herein.

What is claimed as new and desired to be secured by Letters Patent of the United States is:

1. A fluid level indicator for a reservoir of a brake tandem master cylinder, comprising:
    a pair of vertically extending partition walls provided within said reservoir and defining three chambers;
    float means disposed within the middle chamber defined by said partition walls, said float means being reciprocated in response to changes in the level of the brake fluid within said chamber;
    fluid level indicating circuit means for indicating the fluid level in response to the movement of said float means when the fluid level attains a predetermined level;
    said fluid level indicating circuit means including a reed switch positioned at said predetermined fluid level and actuated by means of a magnet incorporated within said float means;
    said pair of partition walls being provided with communication bores at a position just below said predetermined fluid level for communicating said three chambers with one another; wherein,
    said reservoir is provided with a first cap member detachably mounted upon the top of said reservoir and a second and third cap member detachably mounted to said reservoir adjacent to and located on opposite sides of said first cap member, respectively;
    said first cap member being provided with a dependent cylindrical stepped projection extending into said middle chamber of said reservoir;
    said fluid level indicating circuit means being disposed within said projection of said first cap member;
    said float means is slidably engaged with said projection of said first cap member;
    said projection of said first cap member is provided with two shoulder portions between which said float means is movable; and,
    said partition walls are formed integrally with said reservoir and extending vertically upwardly from the bottom of said reservoir and displaced from the top of said reservoir so as to form an opening which connects said three chambers.

2. A fluid level indicator as set forth in claim 1, wherein:
    said remaining two chambers of said reservoir are respectively in fluid communication with the respective fluid brake circuits of said vehicle for independently supplying brake pressure thereto.

* * * * *